(12) United States Patent
Shen et al.

(10) Patent No.: US 10,547,672 B2
(45) Date of Patent: Jan. 28, 2020

(54) ANTI-FLAPPING SYSTEM FOR AUTOSCALING RESOURCES IN CLOUD NETWORKS

(71) Applicant: Microsoft Technology Licensing, LLC, Redmond, WA (US)

(72) Inventors: Andy Shen, Bellevue, WA (US); George Moussa, Bothell, WA (US); Ashwin Kamath Govinda, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 15/499,797

(22) Filed: Apr. 27, 2017

(65) Prior Publication Data

US 2018/0316751 A1    Nov. 1, 2018

(51) Int. Cl.
*H04L 12/24*    (2006.01)
*H04L 29/08*    (2006.01)

(52) U.S. Cl.
CPC .......... *H04L 67/1023* (2013.01); *H04L 41/22* (2013.01)

(58) Field of Classification Search
CPC .... G06F 9/5061; G06F 9/5072; G06F 9/5077; H04L 41/22
USPC ....................................................... 709/226
See application file for complete search history.

(56) References Cited

U.S. PATENT DOCUMENTS

| | | | |
|---|---|---|---|
| 8,307,003 B1 | 11/2012 | Sheth et al. | |
| 8,442,941 B2 | 5/2013 | Yao et al. | |
| 8,768,976 B2 | 7/2014 | McLachlan et al. | |
| 8,819,683 B2 | 8/2014 | Evans | |
| 9,256,467 B1 | 2/2016 | Singh et al. | |
| 9,448,824 B1 * | 9/2016 | Fitzgerald | G06F 9/45533 |
| 9,626,710 B1 | 4/2017 | Chheda et al. | |

(Continued)

FOREIGN PATENT DOCUMENTS

WO    WO-2015153242 A1    10/2015

OTHER PUBLICATIONS

International Search Report and Written Opinion for PCT Application No. PCT/US2018/026487 dated Jul. 16, 2018; 18 pages.

(Continued)

*Primary Examiner* — Moustafa M Meky
*Assistant Examiner* — Elizabeth Kassa
(74) *Attorney, Agent, or Firm* — Ray Quinney & Nebeker P.C.; James Bullough

(57) ABSTRACT

An autoscaling system for scaling resource instances in a cloud network includes an autoscaling application is stored in memory and executed by a processor. The autoscaling application is configured to provide an interface to define an autoscale policy including scale in rules and scale out rules for a plurality of different types of resource instances of a tenant. The autoscaling application is configured to receive capacity data corresponding to a first type of the plurality of different types of resource instances; calculate an estimated instance count for scaling in the first type based on the capacity data and scale in rules; calculate a projection factor based on an estimated instance count and a current instance count; generate adjusted capacity data based on current capacity data and the projection factor; compare the adjusted capacity data and the scale out rules; and selectively scale in the first type based on the comparison.

14 Claims, 13 Drawing Sheets

(56) References Cited

U.S. PATENT DOCUMENTS

| | | |
|---|---|---|
| 9,690,622 B1 | 6/2017 | Argenti et al. |
| 9,712,410 B1 | 7/2017 | Char et al. |
| 9,811,365 B2 | 11/2017 | Borthakur |
| 9,832,118 B1 | 11/2017 | Miller et al. |
| 9,882,949 B1 | 1/2018 | Kalki et al. |
| 10,050,999 B1 | 8/2018 | Rossman |
| 10,069,693 B1 | 9/2018 | Daptardar et al. |
| 10,089,676 B1 | 10/2018 | Gupta et al. |
| 10,129,094 B1 | 11/2018 | Seetharaman |
| 10,148,736 B1 | 12/2018 | Lee et al. |
| 10,176,067 B1 | 1/2019 | Bramhill et al. |
| 10,298,720 B1 | 5/2019 | Miller et al. |
| 10,318,265 B1 | 6/2019 | To et al. |
| 10,326,845 B1 | 6/2019 | Jaeger |
| 2010/0250499 A1 | 9/2010 | Mcalister et al. |
| 2011/0145599 A1 | 6/2011 | Cherkauer et al. |
| 2013/0086273 A1 | 4/2013 | Wray et al. |
| 2013/0132561 A1* | 5/2013 | Pasala ............... H04L 67/1097 709/224 |
| 2013/0205028 A1 | 8/2013 | Crockett et al. |
| 2014/0095505 A1 | 4/2014 | Blanchflower et al. |
| 2014/0201752 A1 | 7/2014 | Agrawal et al. |
| 2014/0207918 A1 | 7/2014 | Kowalski et al. |
| 2014/0279201 A1 | 9/2014 | Iyoob et al. |
| 2014/0280961 A1 | 9/2014 | Martinez et al. |
| 2014/0365662 A1 | 12/2014 | Dave et al. |
| 2015/0081883 A1 | 3/2015 | Katz et al. |
| 2015/0082432 A1 | 3/2015 | Eaton et al. |
| 2015/0089068 A1 | 3/2015 | Islam et al. |
| 2015/0163206 A1 | 6/2015 | Mccarthy et al. |
| 2015/0180948 A1 | 6/2015 | Shao |
| 2015/0205602 A1 | 7/2015 | Prismon et al. |
| 2015/0227598 A1 | 8/2015 | Hahn et al. |
| 2015/0281113 A1* | 10/2015 | Siciliano ............... G06F 9/505 709/226 |
| 2016/0034277 A1 | 2/2016 | Syed et al. |
| 2016/0094401 A1 | 3/2016 | Anwar et al. |
| 2016/0094483 A1 | 3/2016 | Johnston et al. |
| 2016/0094635 A1 | 3/2016 | Kannan et al. |
| 2016/0103717 A1* | 4/2016 | Dettori ............... G06F 9/542 719/318 |
| 2016/0112497 A1 | 4/2016 | Koushik et al. |
| 2016/0117180 A1* | 4/2016 | Cardonha ........... G06F 9/44505 713/100 |
| 2016/0127204 A1 | 5/2016 | Ozaki et al. |
| 2016/0132787 A1 | 5/2016 | Drevo et al. |
| 2016/0132808 A1 | 5/2016 | To et al. |
| 2016/0173599 A1 | 6/2016 | Chablani et al. |
| 2016/0241438 A1 | 8/2016 | Sundaram et al. |
| 2016/0246592 A1 | 8/2016 | Jamjoom et al. |
| 2016/0314064 A1 | 10/2016 | Moretto et al. |
| 2016/0321588 A1 | 11/2016 | Das et al. |
| 2016/0323377 A1* | 11/2016 | Einkauf ............. H04L 67/1076 |
| 2016/0373405 A1 | 12/2016 | Miller et al. |
| 2017/0011418 A1* | 1/2017 | Denton ................. G06F 3/0481 |
| 2017/0019317 A1 | 1/2017 | Lawson et al. |
| 2017/0019467 A1 | 1/2017 | Inamdar et al. |
| 2017/0032613 A1 | 2/2017 | Ovalle et al. |
| 2017/0085447 A1 | 3/2017 | Chen et al. |
| 2017/0093755 A1 | 3/2017 | Pol et al. |
| 2017/0102933 A1 | 4/2017 | Vora et al. |
| 2017/0126792 A1* | 5/2017 | Halpern ............. H04L 41/0896 |
| 2017/0180211 A1 | 6/2017 | Johnson |
| 2017/0199770 A1 | 7/2017 | Peteva et al. |
| 2017/0201569 A1 | 7/2017 | Fu et al. |
| 2017/0286518 A1 | 10/2017 | Horowitz et al. |
| 2017/0331763 A1 | 11/2017 | Li et al. |
| 2018/0027006 A1 | 1/2018 | Zimmermann et al. |
| 2018/0046951 A1 | 2/2018 | Mohindra et al. |
| 2018/0084073 A1 | 3/2018 | Walsh et al. |
| 2018/0088964 A1 | 3/2018 | Hussain et al. |
| 2018/0089249 A1 | 3/2018 | Collins et al. |
| 2018/0089312 A1 | 3/2018 | Pal et al. |
| 2018/0176089 A1 | 6/2018 | Ritter et al. |
| 2018/0196867 A1 | 7/2018 | Wiesmaier et al. |
| 2019/0095241 A1 | 3/2019 | Ago et al. |

OTHER PUBLICATIONS

Thomas Orozco, "Autoscaling Algorithms ", https://scalr-wiki.atlassian.net/wiki/display/docs/Autoscaling+Algorithms, Published on: Jun. 12, 2014, 3 pages.

"Architecture: Real-Time Stream Processing for IoT", Retrieved from: https://cloud.google.com/solutions/architecture/real-time-stream- processing-iot, Retrieved Date: Feb. 21, 2017, 05 Pages.

"Autoscale Service Engines—Retrieved Date", Retrieved from https://avinetworks.com/docs/16.3/autoscale-service-engines/, Feb. 21, 2017, 5 Pages.

"International Search Report and Written Opinion Issued in PCT Application No. PCT/US2018/26476", dated Jul. 16, 2018, 12 Pages.

"Final Office Action Issued in U.S. Appl. No. 15/499,389", dated Apr. 8, 2019, 20 Pages.

"Non-Final Office Action Issued in U.S. Appl. No. 15/499,389", dated Nov. 1, 2018, 16 Pages.

"Final Office Action Issued in U.S. Appl. No. 15/499,787", dated May 13, 2019, 16 Pages.

"Non Final Office Action Issued in U.S. Appl. No. 15/499,787", dated Jan. 3, 2019, 18 Pages.

"Non-Final Office Action Issued in U.S. Appl. No. 15/499,389", dated Jul. 29, 2019, 13 Pages.

"Non-Final Office Action Issued in U.S. Appl. No. 15/499,787", dated Sep. 13, 2019, 18 Pages.

"Final Office Action Issued in U.S. Appl. No. 15/499,389", dated Nov. 22, 2019, 13 Pages.

* cited by examiner

| Name | Resource Type | Resource Group | Status | Storage Account | Event Hub Namespace | Log Analytics |
|---|---|---|---|---|---|---|
| East Side LA | Logic App | East Side | Enabled | | | |
| East Side VM | VMSS | East Side | Enabled | East Metric Store | East Hub | |
| East Side EDB | DB | East Side | Disabled | | | |
| West Web | Web Server | West Side | Enabled | | | West LA |
| West Side VM | VMSS | West Side | Enabled | | East Hub | |
| West Side EDB | DB | West Side | Disabled | | | |

FIG. 12A

ANTI-FLAPPING SYSTEM FOR AUTOSCALING RESOURCES IN CLOUD NETWORKS

FIELD

The present disclosure relates to cloud networks, and more particularly to systems and methods for autoscaling resources in a cloud network.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cloud service providers rent computing and data resources in a cloud network to customers or tenants. Examples of computing resources include web services and server farms, elastic database pools, and virtual machine and/or container instances supporting infrastructure as a service (IaaS) or platform as a service (PaaS). Examples of data resources include cloud storage. Tenants typically enter into a service level agreement (SLA) that sets performance guarantees and governs other aspects relating to the relationship between the cloud services provider and the tenant.

Data centers include servers or nodes that host one or more VM and/or container instances. The VM instances run on a host operating system (OS), run a guest OS and interface with a hypervisor, which shares and manages server hardware and isolates the VM instances. Unlike VM instances, container instances do not need a full OS to be installed or a virtual copy of the host server's hardware. Container instances may include one or more software modules and libraries and require the use of some portions of an operating system and hardware. As a result of the reduced footprint, many more container instances can be deployed on a server as compared to VMs.

If too much capacity is allocated by the cloud network, the tenant pays too much for the cloud resources. If not enough capacity is provided, the SLA may be violated and/or the processing needs of the tenant are not satisfied. Tenants are often forced to over-provision cloud resources based on peak usage and over pay or under-provision resources to save cost at the expense of performance during peak usage.

SUMMARY

An autoscaling system for scaling resource instances in a cloud network includes a processor and memory. An autoscaling application is stored in memory and executed by the processor and is configured to a) provide an interface configured to define an autoscale policy including scale in rules and scale out rules for a plurality of different types of resource instances of a tenant; b) receive capacity data corresponding to a first type of the plurality of different types of resource instances; c) calculate an estimated instance count for scaling in the first type based on the capacity data and scale in rules; d) calculate a projection factor based on an estimated instance count and a current instance count; e) generate adjusted capacity data based on current capacity data and the projection factor; f) compare the adjusted capacity data and the scale out rules; and g) selectively scale in the first type based on the comparison in f).

In other features, if the adjusted capacity data is within the scale out rules, the autoscaling application scales in the first type based on the estimated instance count. If the adjusted capacity data is not within the scale out rules, the autoscaling application is configured to: h) adjust the estimated instance count to generate an adjusted estimated instance count; i) calculate a second projection factor based on the adjusted estimated instance count and a current instance count; j) generate second adjusted capacity data based on the capacity data and the second projection factor; k) compare the second adjusted capacity data to the scale out rules; and l) selectively scale in the first type based on the comparison in k).

In other features, h) is performed by incrementing the estimated instance count. The plurality of different types of the resource instances include a virtual machine type and at least one other type selected from a group consisting of a container type, an event hub type, a telemetry type, an elastic database pool type, a web server type and data storage type.

In other features, h)-l) are repeated until either the scale in is performed or the adjusted estimated instance count is equal to the current instance count.

An autoscaling system for scaling resource instances in a cloud network includes a processor and memory. An autoscaling application is stored in memory and executed by the processor and is configured to a) provide an interface configured to define an autoscale policy for a plurality of different types of resource instances of a tenant; b) receive capacity data corresponding to a first type of the plurality of different types of resource instances; c) calculate at least one of an estimated instance count and estimated capacity units for scaling of the first type based on the capacity data; d) estimate a first capacity level for the first type based on the at least one of the estimated instance count and the estimated capacity units; e) compare the first capacity level to capacity criteria defined by at least one of the autoscale policy and a service level agreement for the first type; and f) selectively autoscale the first type based on the comparison.

In other features, the autoscaling application repeats b) to f) for other types of the plurality of different types of resource instances of the tenant. The capacity data includes at least one of metric data and log data for one of the plurality of different types of resource instances. If the first capacity level is within the capacity criteria defined by the at least one of the autoscale policy and the service level agreement, the autoscaling application scales the one of the plurality of different types of the resource instances based on the at least one of the estimated instance count and the estimated capacity units.

In other features, if the first capacity level is not within the capacity criteria defined by the at least one of the autoscale policy and the service level agreement, the autoscaling application is configured to g) adjust the at least one of the estimated instance count and the estimated capacity units to generate at least one of an adjusted estimated instance count and an adjusted estimated capacity units; h) estimate a second capacity level for the one of the plurality of different types of resource instances based on the at least one of the adjusted estimated instance count and the adjusted estimated capacity units; i) compare the second capacity level to the capacity criteria defined by the at least one of the autoscale policy and the service level agreement for the one of the plurality of different types of resource instances; and j) selectively autoscale the one of the plurality of different types of resource instances based on the comparison in i).

In other features, g) is performed by reducing a scaling change defined by the estimated instance count and the estimated capacity units.

In other features, g)-j) are repeated until either autoscaling is performed or the at least one of the adjusted estimated instance count and the adjusted estimated capacity units is equal to at least one of a current instance count and a current estimated capacity units, respectively. The interface defines the autoscale policy for the plurality of different types of resource instances using a common protocol. The autoscaling application is configured to define minimum and maximum values for at least one of capacity units and resource instance counts for the plurality of different types of the resource instances using a common protocol.

In other features, the autoscaling application is configured to define metric-based rules for the plurality of different types of the resource instances using a common protocol.

In other features, the plurality of different types of the resource instances include a virtual machine type and at least one other type selected from a group consisting of a container type, an event hub type, a telemetry type, an elastic database pool type, a web server type and data storage type.

A method for scaling resource instances in a cloud network includes a) defining an autoscale policy including scale in rules and scale out rules for a plurality of different types of resource instances of a tenant; b) receiving capacity data corresponding to a first type of the plurality of different types of resource instances for the tenant; c) calculating an estimated instance count for scaling in the first type based on the capacity data and the scale in rules; d) calculating a projection factor based on a ratio of at least one of an estimated instance count and a current instance count; e) generating an adjusted capacity data based on the capacity data and the projection factor; f) comparing the adjusted capacity data to the scale out rules; and g) selectively scaling in the first type based on the comparison in f).

In other features, if the adjusted capacity data is within the scale out rules, scaling in the first type based on the estimated instance count. If the adjusted capacity data is not within the scale out rules, the method includes h) incrementing the estimated instance count to generate an adjusted estimated instance count; i) calculating a second projection factor based on the adjusted estimated instance count and a current instance count; j) generating a second adjusted capacity data based on a current metric data and the second projection factor; k) comparing the second adjusted capacity data to the scale out rules; and l) selectively scaling in the first type based on the comparison in k).

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIGS. 12A and 12B are illustrations of examples of user interfaces for configuring metric and log data collection for cloud resources of a customer according to the present disclosure.

In the drawings, reference numbers may be reused to identify similar and/or identical elements.

DESCRIPTION

Figure 1:
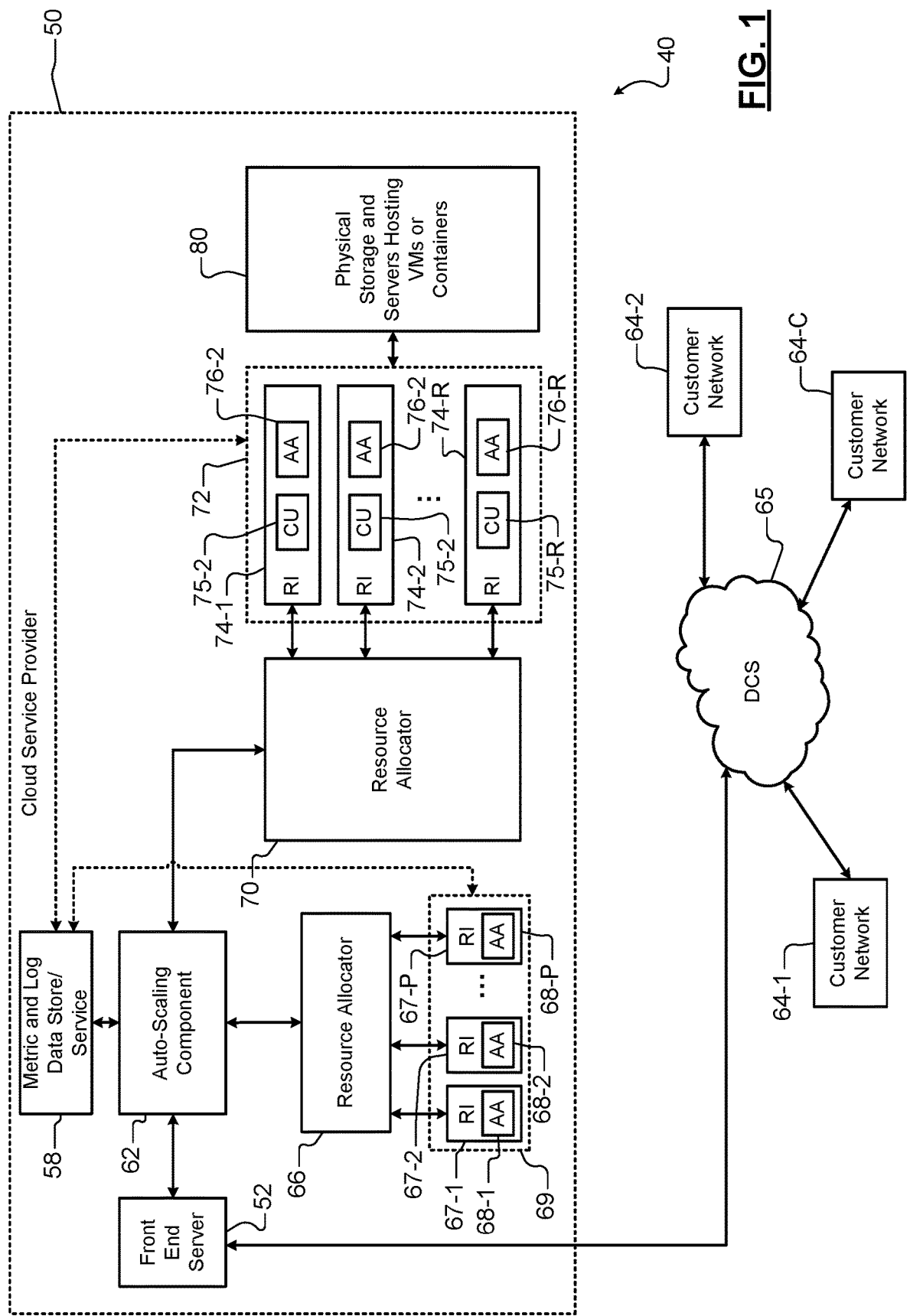
FIG. 1 is a functional block diagram of an example of a network including a cloud service provider including an autoscaling component for data and computing according to the present disclosure.

Cloud computing is a type of Internet-based computing that is able to supply a set of on-demand computing and data resources. In effect, cloud computing allows customers to rent data and computing resources without requiring investment in on-premises infrastructure. For example, Microsoft Azure® is an example of a cloud computing service provided by Microsoft for building, deploying, and managing applications deployed to Microsoft's global network of datacenters.

Resources refer to an instantiation of a data or compute service offered by a resource provider (for example—a virtual machine (VM), a website, a storage account, an elastic database pool, etc.). A cloud resource provider provides a front end including a set of application protocol interfaces (APIs) for managing a life cycle of resources within the cloud network. Resource identifications (IDs) or store keeping units (SKUs) may be used to uniquely identify a specific instantiation of a resource—for example, a VM or container instance. A resource type refers to a type of data or compute service offered by the resource provider.

For example, platform as a service (PaaS) refers to customers deploying application code to one or more VMs in a cloud network. The cloud services provider manages the VMs. In another example, infrastructure as a service (IaaS) refers to customers managing one or more VMs deployed to a data center. Virtual machine scale sets (VMSS) refer to services for managing a set of similar VMs.

Autoscaling refers to a cloud service that adjusts the capacity of one or more data and/or computing resources supporting an application based on demand and/or a set of rules. When monitored performance data indicates that the load on the application and/or corresponding resource increases, autoscaling is used to automatically scale out resources or increase capacity to ensure that the application and/or resource meets a service level agreement (SLA), min/max settings or other performance levels defined metric-based or log-based rules. The effect of scaling out is to increase capacity, which also increases cost.

If the load on the application and/or corresponding cloud resource decreases, autoscaling scales in or decreases resources instances or capacity units to decrease capacity automatically, which decreases cost. For example, customer applications often have variable loads at different times of the week such as during weekdays as compared to during weekends. Other customer applications may have variable loads at different times of the year, for example during certain seasons such as holidays, tax season, sales events, or other times.

The systems and methods according to the present disclosure allow customers to create an autoscale policy (which may be modeled as a resource) to manage the autoscale configuration. The customers also create conditional metric-based rules to determine when to scale in and/or scale out. An autoscale component exposes a set of APIs to manage the autoscale policy. For example, the autoscale policy may support minimum and maximum instance counts or performance level of the resource instance.

Systems and methods for autoscaling according to the present disclosure allow tenants in a cloud network to configure one or more metric-based rules that determine when to scale in and/or scale out. For example, if the average CPU performance data for a group of VMs is greater than 70% over a predetermined period (such as 15 minutes), an autoscale component scales out by deploying one or more VMs to the tenant to increase capacity by a predetermined amount such as 10% or 20%. A related rule may specify that if the average CPU performance data is less than 60% for a second predetermined period (such as 1 hour), one or more VMs are removed to increase the workload on the remaining VMs.

The systems and methods for autoscaling according to the present disclosure provide a similar autoscaling protocol for multiple different types of cloud data and/or computing resources such as storage, VMs, web services and/or databases types to allow the tenant to control multiple cloud resources using a common user interface. For example, a single tenant is able to manage autoscaling policies on a website server using the same protocol and a common interface. In other words, the tenant can manage autoscale policies for PaaS, IaaS, virtual machine scale sets, event hubs, elastic database pools using a set of common protocols for any cloud service that plug into the autoscale component.

In some examples, the cloud services provider uses resource identifiers (IDs) such as stock keeping units (SKUs) to identify different SLAs, traits of the SLAs (such as whether or not autoscaling is enabled), different cloud resources, different capacity units and/or different processing capacities. The cloud service provider exposes the available SKUs and information specifying whether or not the cloud service type supports autoscaling, minimum/maximum capacity, maximum/minimum instance counts, and/or other conditional metric-based or log-based rules. A resource type has different SKUs to specify different types of that resource. For example, VMs may have different VM sizes representing different numbers of processing cores. For example, VM scale sets, elastic database pools or web server farms have different SKUs representing different capabilities.

A common protocol is used to obtain a current capacity or instance count, to modify the current capacity unit or instance count, etc. For example, a GET operation may be used to obtain the capacity or instance count on any cloud service resource ID. In another example, a PATCH operation is used to adjust the capacity or instance count on any cloud service resource ID. A common API is also used to retrieve metric or log data for any given resource ID. The log and/or metric data can be used by the metric-based rules to make conditional autoscaling decisions.

The systems and methods for autoscaling provide a single management interface to allow tenants to control autoscaling policies across diverse resources types. In other words, the present disclosure is implemented as an autoscaling component that is not tied to a virtual-machine stack. The systems and methods for autoscaling allow any resource to participate in autoscaling as long as it abides by the common set of protocols used by the autoscaling component. In other words, the stack structure is abstracted to allow for scaling any multi-instance resource according to rules provided by the subscriber of the service. Thus, the resource can be plugged into the autoscaling component and will receive an autoscale experience on top of the resources.

In operation, a metric and log data store/service publishes a set of protocols for log and metric data from the resource instances. A tenant, who owns the resource and subscribes for resource scaling functionality, exposes one or more conditional metric-based or log-based rules that govern the desired scaling operations. The autoscaling component is located between the metric and log data store/service and the tenant such that the autoscaling component compares the rules and log/metric data and makes a determination whether to proceed with autoscaling.

One design that facilitates autoscaling is the use of common multi-instance resource patterns (such as VM scale sets). These resource patterns are equipped to scale in and scale out in response to a signal from the autoscaling component to provide a consistent scaling experience across many types.

The protocols that are used to control scaling are, in many ways, extendable to meet the owner's needs. That is, as long as the owner provides rules for their resources that match the predetermined protocols, any variation of rules is possible. In this way, an owner can build their own heuristics living inside VMs and/or other resource(s) they have built and that collect metric and/or log data.

Referring now to FIG. 1, a network 40 includes a cloud services provider 50 with a front end server 52 and an autoscaling component 62 that scales two or more different types of cloud resource instances. A metric and log data store/service 58 includes one or more servers that provide access to metric and log data for the different types of resource instances in the cloud network.

The network 40 communicates with one or more customer networks 64-1, 64-2, . . . 64-C (collectively customer networks 64) where C is an integer greater than zero. The customer networks 64 may represent enterprise networks, smaller scale networks or individual computers. In some examples, the customer networks 64 are connected to the cloud services provider 40 via a distributed communication system 65 such as the Internet. However, the customer networks 64 can be connected to the cloud services provider 40 using a dedicated communication link or using any other suitable connection.

The front end (FE) server 52 provides an external API that receives requests for data and/or computing resources. As can be appreciated, the data and/or computing resources may relate to VM and container instances and to one or more other resource instances such as data storage, telemetry handling, web servers, elastic database (DB) pools, etc.

The autoscaling component 62 communicates with at least two different types of resources. For example, the autoscaling component 62 communicates with a resource allocator 66 that scales out or scales in a group 69 of data and/or computing resources by directly increasing or decreasing individual resource instances 67-1, 67-2, . . . , and 67-P (collectively resource instances 67). In some examples, each of the resource instances 67-1, 67-2, . . . , and 67-P includes an agent application (AA) 68-1, 68-2, . . . , and 68-P that generates and/or aggregates log and metric data having a common schema. In some examples, the common schema includes one or more common fields such as time, resourceId, operationName, KeyRestore, operationVersion, category, resultType, resultSignature, resultDescription, durationMs, callerIpAddress, correlationId, identity, appid, and/or properties. Some of the fields are auto-populated and other fields are user defined. In some examples, the common schema is extensible and additional fields can be added. In some examples, the resource instances 67 are discrete units having the same size/capacity. For example, VMs or containers having the same number of processing cores (or processing capacity), applications and/or memory may be used.

The autoscaling component 62 communicates with a resource allocator 70 that scales out or scales in a group 72 of data or computing resources by increasing or decreasing capacity or throughput of resource instances 74-1, 74-2, . . . , 74-R (resource instances 74). In some examples, the resource instances 74 are logical or application-based data and/or computing resources. The cloud network manages physical resources 80 to support the capacity of the resource instances 74. In some examples, each of the resource instances 74-1, 74-2, . . . , 74-R has one or more defined capacity units 75-1, 75-2, . . . , and 75-P and includes an agent application (AA) 76-1, 76-2, . . . , and 76-P that generates log and metric data having a common schema, respectively.

For example, the resource instances 74 may include telemetry handling resource instances such as event hubs that have a logical capacity defined in throughput units such as megabits per second (Mb/s). For example, the telemetry handling resource instances may have capacity units defined in 1 Mb/s increments from 1 Mb/s to 20 Mb/s. In another example, the resource instances 74 may correspond to elastic database pools. The capacity for elastic database pools may be defined by a combination of metrics including maximum data storage, maximum number of databases per pool, the maximum number of concurrent workers per pool, the maximum concurrent sessions per pool, etc. In still another example, the resource instances 74 may correspond to web servers and web server farms.

Figure 2:
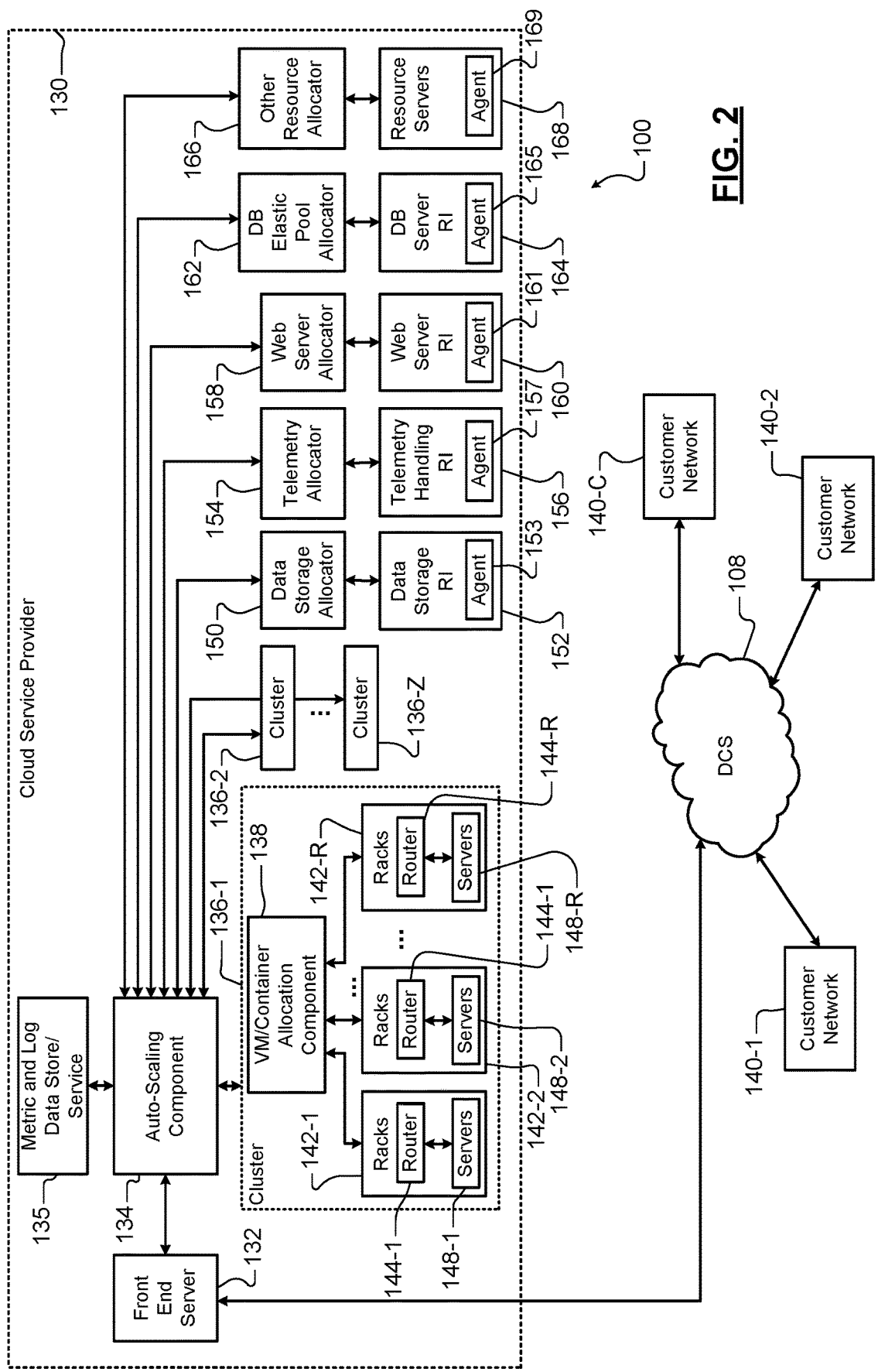
FIG. 2 is a functional block diagram of another example of a network including a cloud service provider including an autoscaling component for data and computing according to the present disclosure.

Referring now to FIG. 2, a network 100 includes a cloud services provider 130 with a front end server 132 and an autoscaling component 134. While the front end server 132 and the autoscaling component 134 are shown as separate devices, the front end server 132 and the autoscaling component 134 can be implemented on the same server or further split into additional servers. A metric and data log store/service 135 includes one or more servers that provide access to metric and log data for different types of resource instances in the cloud network.

The network 100 includes one or more customer networks 140-1, 140-2, . . . 140-C (collectively customer networks 140) where C is an integer greater than zero. The customer networks 140 may represent enterprise networks, smaller scale networks or individual computers. In some examples, the customer networks 140 are connected to the cloud services provider 130 via a distributed communication system 108 such as the Internet. However, the customer networks 140 can be connected to the cloud services provider 130 using a dedicated communication link or in any other suitable manner.

The front end (FE) server 132 provides an external API that receives requests for data and/or computing resources. As can be appreciated, the data and/or computing resources may relate to VM and container instances and/or to one or more other resource instances such as data storage, telemetry handling, web servers, elastic database (DB) pools, etc.

In some examples, the data and computing resources relate to virtual machines or containers that are implemented on one or more clusters 136-1, 136-2, . . . 136-Z (collectively clusters 136), where C is an integer greater than zero. Each of the clusters 136 includes an allocation component 138 such as a server to allocate one or more VM or container instances to the nodes. The allocation component 138 communicates with one or more racks 142-1, 142-2, . . . , and 142-R (collectively racks 142), where R is an integer greater than zero. Each of the racks 142-1, 142-2, . . . , and 142-R includes one or more routers 144-1, 144-2, . . . , and 144-R (collectively routers 144) and one or more servers 148-1, 148-2, . . . , and 148-R, respectively (collectively servers or nodes 148). Each of the servers 148 can include one or more container or VM instances. In FIG. 2, the allocation component 138 is associated with a single cluster such as the cluster 136-1. However, the allocation component 138 may be associated with two or more clusters 136.

In addition to VM and container instances, the cloud service provider 130 may include a data storage allocator 150 and a plurality of data storage resource instances 152. Each of the data storage resource instances 152 includes an agent application 153 that generates metric and log data. In some examples, the data storage resource instances 152 include blocks of storage.

The cloud services provider 130 may further include a telemetry allocator 154 and a plurality of telemetry handling resource instances 156 that collect, transform, and/or store events from other resource instances in the cloud and stream the events to customer networks and/or devices. In some examples, the telemetry allocator 154 allocates a single resource instance having two or more discrete capacity levels for each tenant. The telemetry allocator 154 manages the discrete capacity levels of the resource instances using the autoscaling policy. In some examples, the telemetry allocator 154 manages the capacity of each of the resource instances using one or more event hubs. In other words, the capacity of the resource instance is varied to provide different data such as 1 Mb/s, 2 Mb/s, 3 Mb/s . . . 20 Mb/s, although higher and lower data rates can be used. In some examples, the telemetry handling resource instances 156 include agent applications 157 for generating log and metric data relating to operation of the telemetry handling resource instances 156.

The cloud services provider may further include a web server allocator 158 and one or more web server resource instances 160. Each of the web server resource instances 160 include agent applications 161. In some examples, the web server resource instances are logical constructs providing predetermined capacity units and the cloud network manages the corresponding physical devices or servers to meet the agreed upon capacity units.

The cloud services provider may also include an elastic database (DB) pool allocator 162 and database (DB) server resource instances 164. Agent applications 165 may be used to collect and send metrics and log data. While specific types of allocators and resource instances are shown, allocators 166 for other types of resource instances 168 may also be used. Agent applications 169 may also be used to collect and send metric and log data as needed.

Figure 3B:
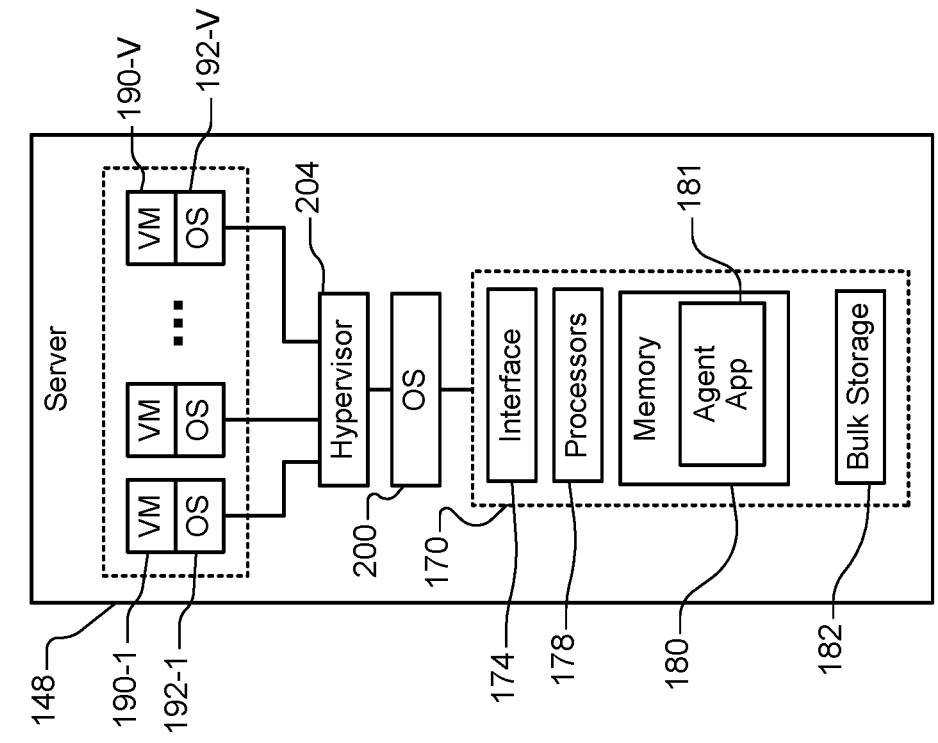
FIGS. 3A and 3B are functional block diagrams of examples of servers hosting VM and/or container instances according to the present disclosure.
Figure 3A:
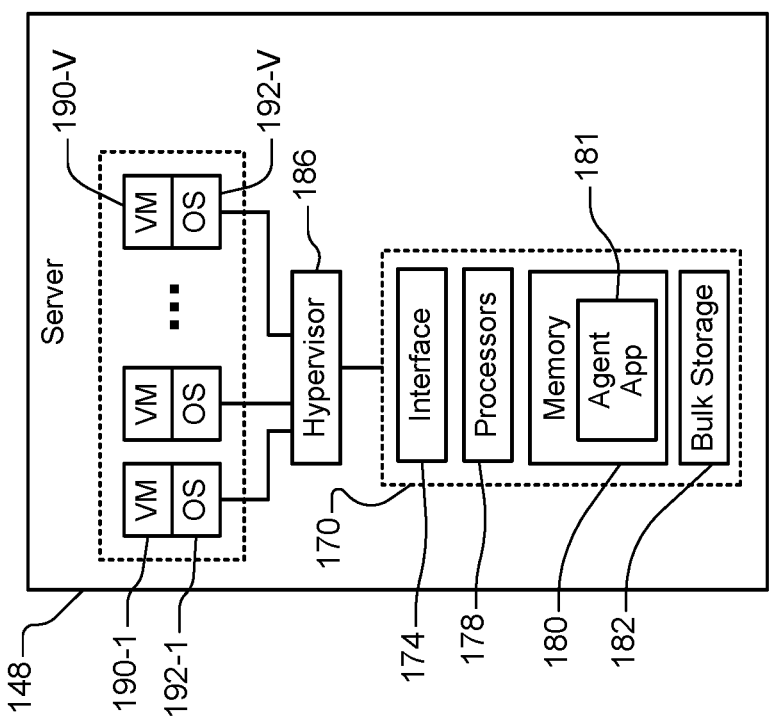

Referring now to FIGS. 3A and 3B, examples of the servers 148 for hosting VM and/or container instances are shown. In FIG. 3A, a server using a native hypervisor is shown. The server 148 includes hardware 170 such as a wired or wireless interface 174, one or more processors 178, volatile and nonvolatile memory 180 and bulk storage 182 such as a hard disk drive or flash drive. A hypervisor 186 runs directly on the hardware 170 to control the hardware 170 and manage virtual machines 190-1, 190-2, . . . , 190-V (collectively virtual machines 190) and corresponding guest operating systems 192-1, 192-2, . . . , 192-V (collectively guest operating systems 192) where V is an integer greater than one.

In this example, the hypervisor 186 runs on a conventional operating system. The guest operating systems 192 run as a process on the host operating system. Examples of the hypervisor include Microsoft Hyper-V, Xen, Oracle VM Server for SPARC, Oracle VM Server for x86, the Citrix XenServer, and VMware ESX/ESXi, although other hypervisors can be used.

Referring now to FIG. 3B, a second type of hypervisor can be used. The server 148 includes hardware 170 such as a wired or wireless interface 174, one or more processors 178, volatile and nonvolatile memory 180 and bulk storage 182 such as a hard disk drive or flash drive. A hypervisor 204 runs on a host operating system 200. Virtual machines 190-1, 190-2, . . . , 190-V (collectively virtual machines 190) and corresponding guest operating systems 192-1, 192-2, . . . , 192-V (collectively guest operating systems 192). The guest operating systems 192 are abstracted from the host operating system 200. Examples of this second type include VMware Workstation, VMware Player, VirtualBox, Parallels Desktop for Mac and QEMU. While two examples of hypervisors are shown, other types of hypervisors can be used.

Figure 4:
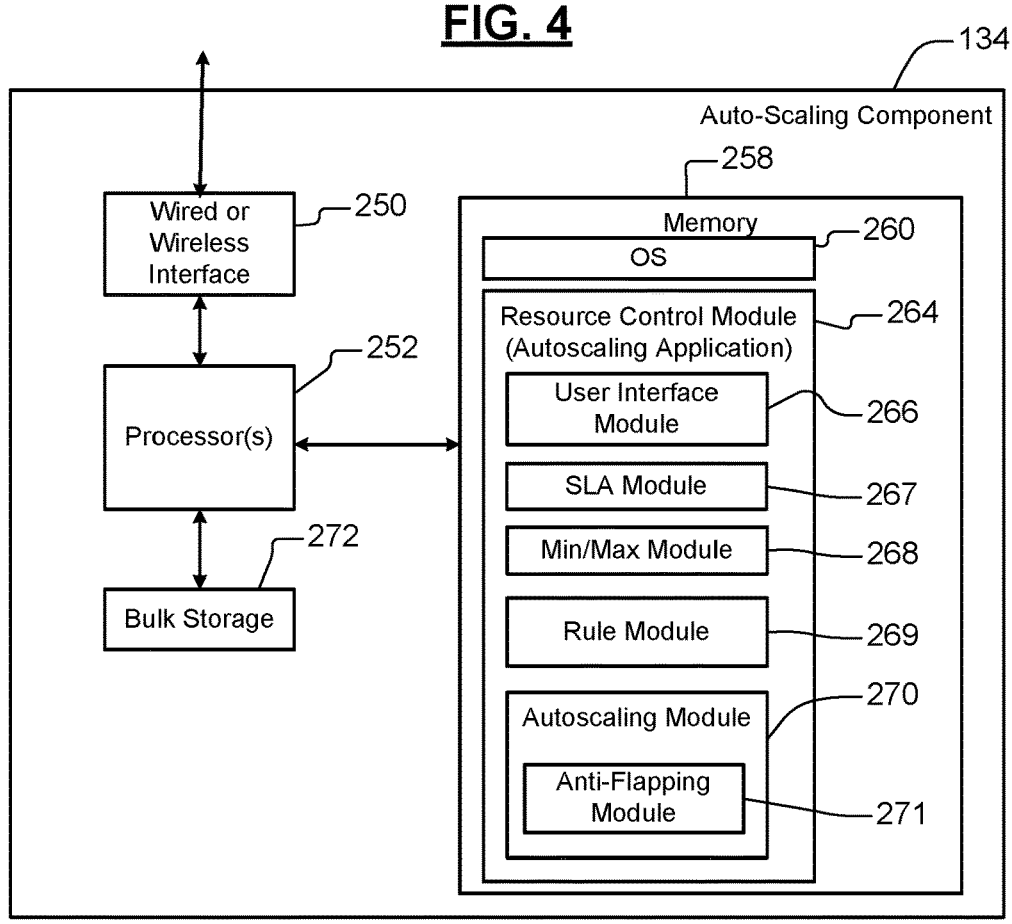
FIG. 4 is a functional block diagram of an example of an autoscaling component according to the present disclosure.
Figure 5:
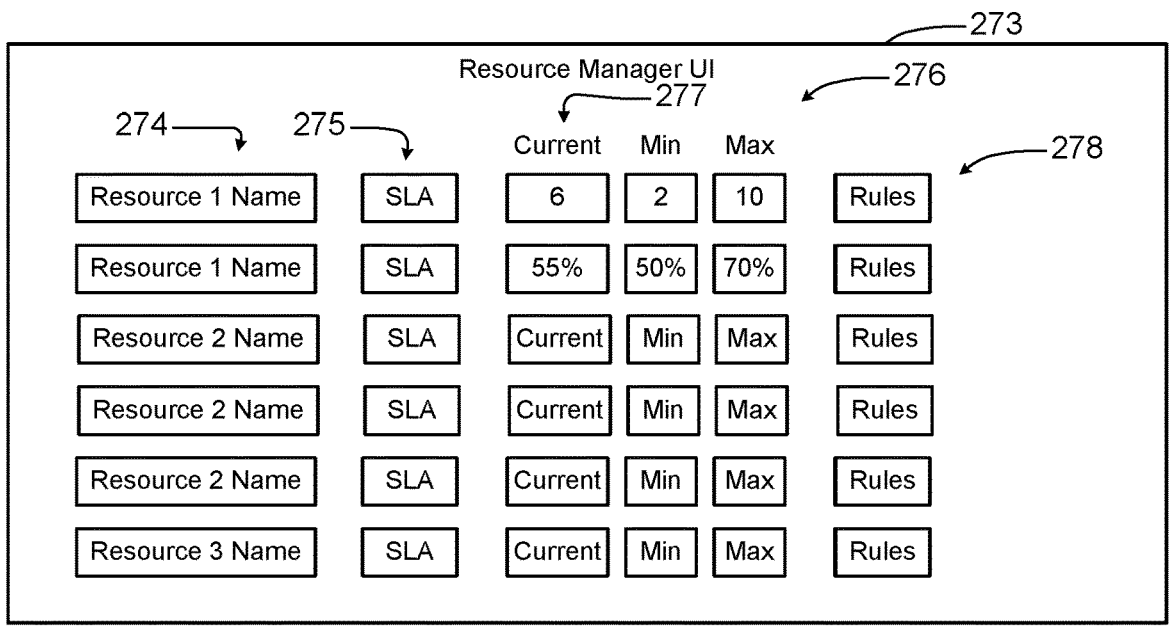
FIG. 5 is an illustration of an example of a user interface for the autoscaling component according to the present disclosure.

Referring now to FIGS. 4 and 5, a server-implemented example of the allocation component 138 is shown in further detail and includes a computing device with a wired or wireless interface 250, one or more processors 252, memory 258 and bulk storage 272 such as a hard disk drive. An operating system 260 and resource control module 264 are located in the memory 258. The resource control module 264 includes a user interface module 266 for generating a user interface to allow a tenant to control autoscaling of resources. The resource control module 264 further includes an SLA module 267 to allow a customer access to a current SLA and/or other available SLAs.

The resource control module 264 further includes a min/max module 268 to allow a tenant to set and control a minimum capacity or instance count and a maximum capacity or instance count for a particular resource. Alternately, these values may be controlled or limited by the SLA or SKU. The resource control module 264 further includes a metric rule generating module 269 to allow a customer to create conditional metric-based rules.

The resource control module 264 further includes an autoscaling module 270 that controls scale in and scale out of cloud resources based on the metric values, min/max values and/or metric-based rules corresponding to the resource. When a mismatch occurs between the min/max values and/or the metric-based rules and the current performance, capacity or resource instance counts, the autoscaling module 270 may generate an estimated resource instance count for the scaling in or scaling out operation. In some examples, the estimate can be a proportional estimate or other techniques can be used. In some examples, the metric or log-based rules may specify the estimated scale in or scale out criteria. The autoscaling module 270 includes an anti-flapping module 271 to reduce or prevent instability caused by rapid scaling in and scaling out in response to estimated capacity changes based on the metric values, min/max values and/or rules corresponding to the cloud resource as will be described below.

In FIG. 5, a resource manager user interface 273 displays resources 274 and command buttons or dialog boxes 275, 277 and 278 to allow the customer to access SLA details relating to the corresponding resource, set min/max values relating to the corresponding resource, view current capacity or instance count values relating to the corresponding resource, or rules relating to the corresponding resource. As can be appreciated, each resource may include one or more values that are controlled. For example, VM-related resources may have the min/max value relating to VM instance counts and processor capacity for a group of VMs.

Figure 6:
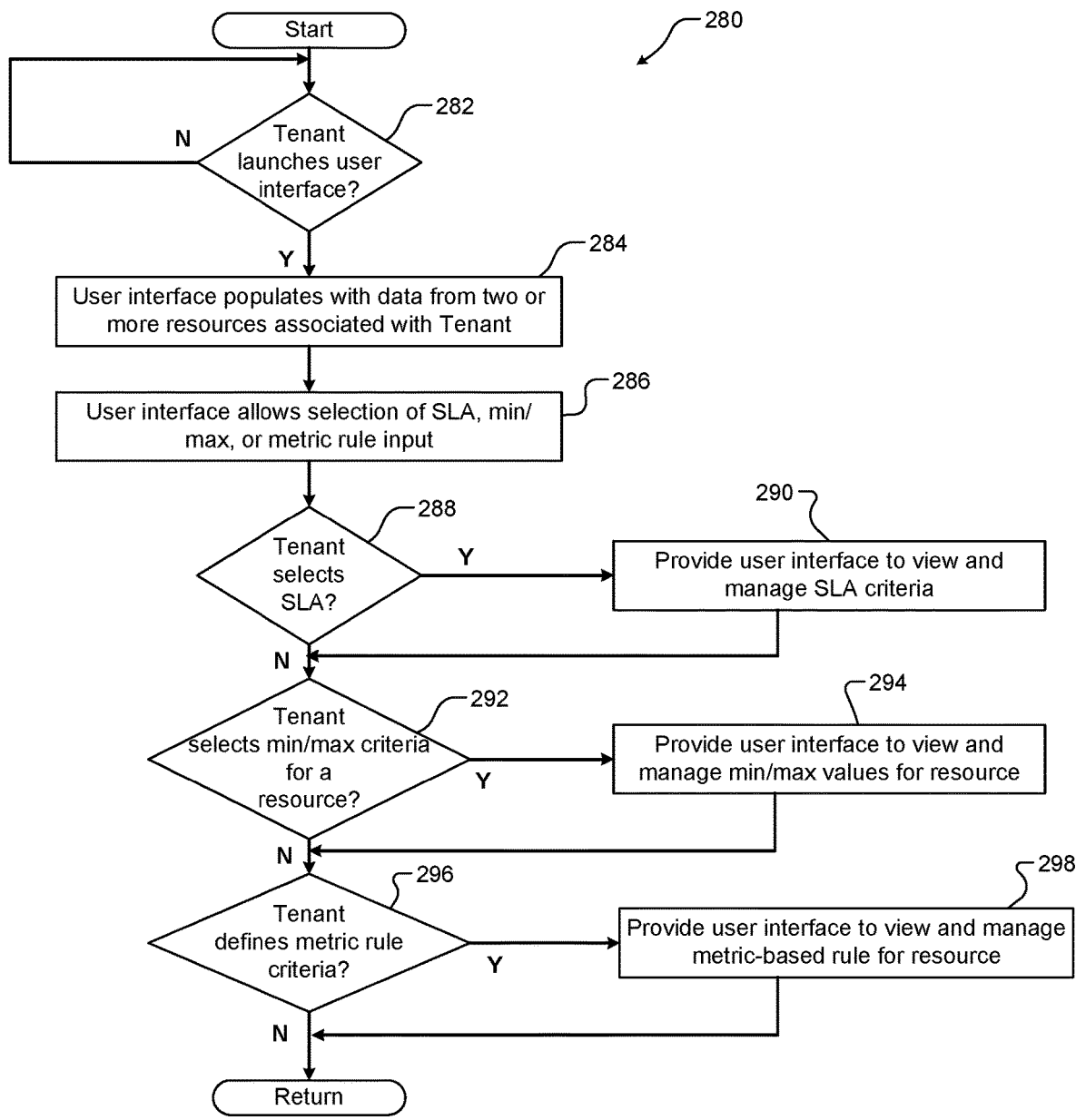
FIGS. 6-7 are flowcharts illustrating methods for autoscaling multiple data or computing resources in a cloud network using a common interface according to the present disclosure.

Referring now to FIG. 6, a method 284 for operating the user interface is shown. At 282, the method determines whether the tenant launches the user interface. When 282 is true, the user interface populates a screen with data from two or more resources associated with the tenant at 284. At 286, the user interface allows selection or viewing of one or more of SLA details, min/max details, and/or metric-based rules.

If the tenant selects a button or launches a dialog box relating to an SLA as determined at 288, the user interface provides an interface to view and/or manage SLA criteria at 290. For example, the user may select another SKU with increased and/or decreased capabilities or different capacity units relative to a current SKU. If the tenant selects a button or launches a dialog box relating to min/max criteria at 292, the user interface allows a user to view and/or manage min/max criteria for a corresponding resource at 294. For example, the user may manually increase or decrease a minimum value or a maximum value.

If the tenant selects a button or launches a dialog box relating to a metric-based rule at 296, the user interface allows a tenant to view and/or manage metric-based rules at 298. For example, the user may set thresholds and/or adjust periods corresponding to a particular rule.

Figure 7:
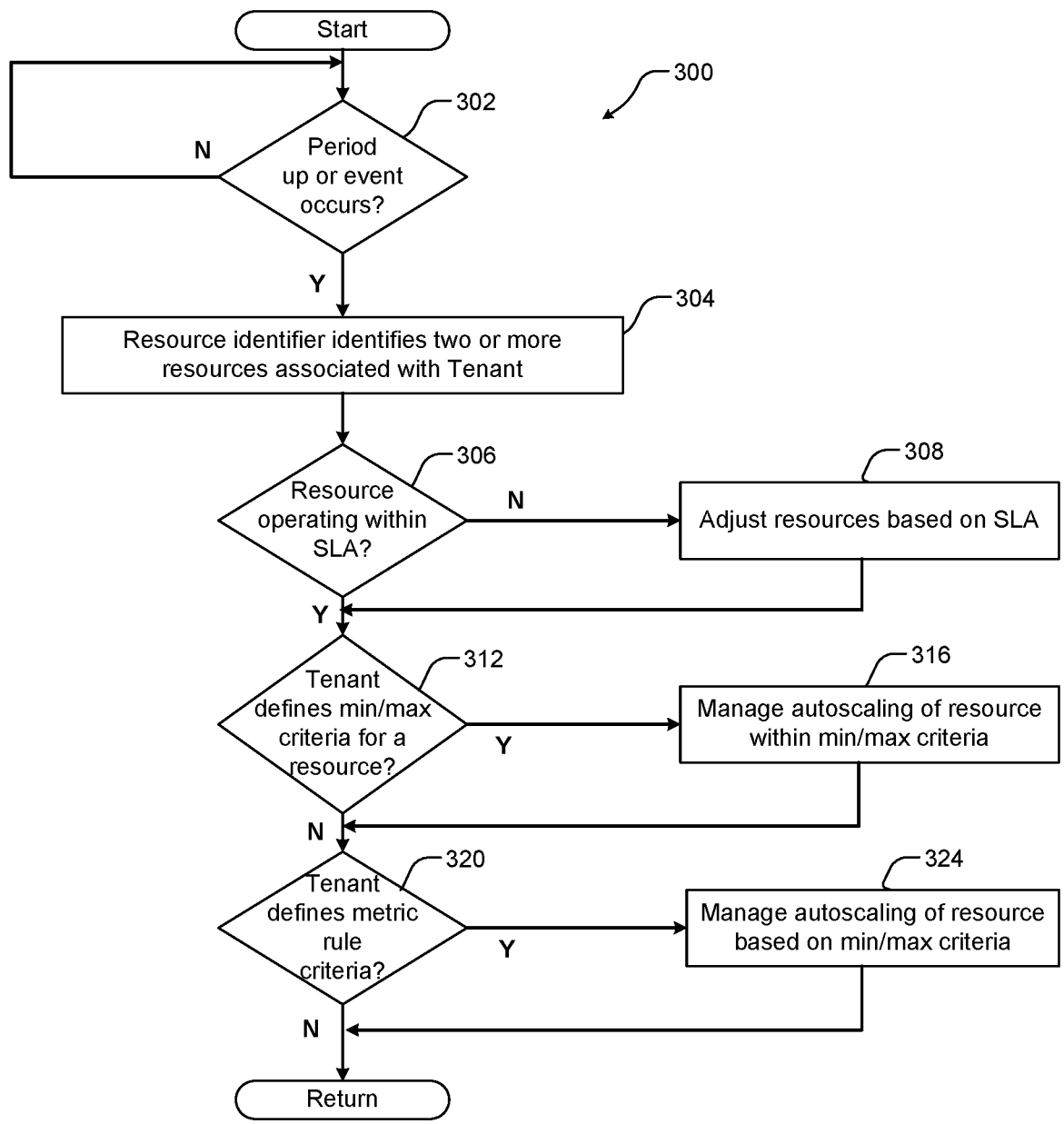

Referring now to FIG. 7, a method 300 for operating the autoscaling component is shown. When a period is up or an event occurs as determined at 302, resources associated with the tenant are identified at 304. At 306, the method determines whether the resources are operating within the SLA. If 306 is false, operation or resource allocation are adjusted (added or removed) to ensure that the conditions of the SLA are met at 308.

If 306 is true, the method determines whether the min/max criteria for one or more resources are met at 312. If 312 is false, operation or resource allocation are adjusted to ensure that the min/max criteria is met at 316. If 312 is true, the autoscaling component determines whether the metric-based criteria for one or more resources are met at 320. If 312 is false, operation or resource allocation are adjusted to ensure that the min/max criteria is met at 316. As can be appreciated, the method may continue from 308, 316 and/or 324 with 302 to allow settling of the system prior to analysis of other criteria. Alternately, the method may continue from 308, 316 and 324 at 312, 320 or return, respectively.

Figure 8:
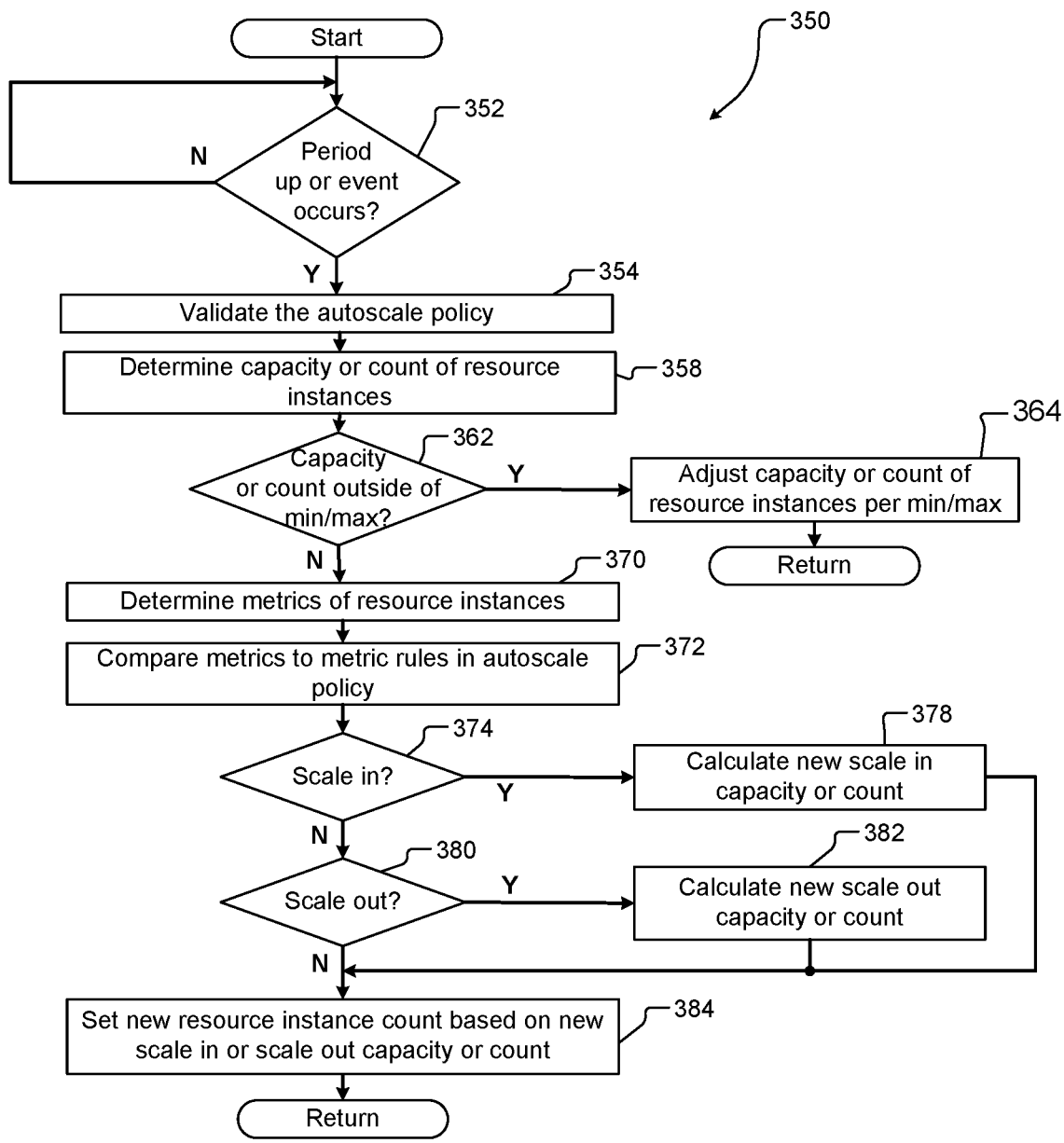
FIG. 8 is a flowchart illustrating a more detailed example for scaling in or scaling out multiple data or computing resources in a cloud network using a common interface according to the present disclosure.

Referring now to FIG. 8, a more detailed method 350 for performing autoscaling is shown. At 352, the method determines whether a period is up or an event occurs. At 354, the autoscaling policy is validated. At 358, the capacity or count of resource instances is determined. At 362, the method determines whether the capacity or a resource instance count is outside of the min/max value. If 362 is true, the capacity or the resource instance count is adjusted and the method returns at 364.

If 362 is false, metrics associated with the resource instances are retrieved at 370. At 372, the metrics are compared to the metric-based rules in the autoscaling policy. At 374, the method determines whether resource autoscale steps should be performed. If 374 is true, the method calculates the new scale in capacity or count at 378. In some examples, the new scale in capacity or count may be determined using a proportional calculation based upon a comparison of the current metric, count or capacity and a desired metric, count or capacity as will be described further below, although other scale out calculations may be used.

At 380, the method determines whether resource scale out steps should be performed. If 380 is true, the method calculates the new scale out capacity at 382. In some examples, the scale out capacity or count may be a proportional calculation based upon a comparison of the current metric or capacity and a desired metric or capacity as will be described further below, although other scale out calculations may be used. At 384, the method sets the new resource instance count based on the new scale in or scale out capacity or count.

Figure 9:
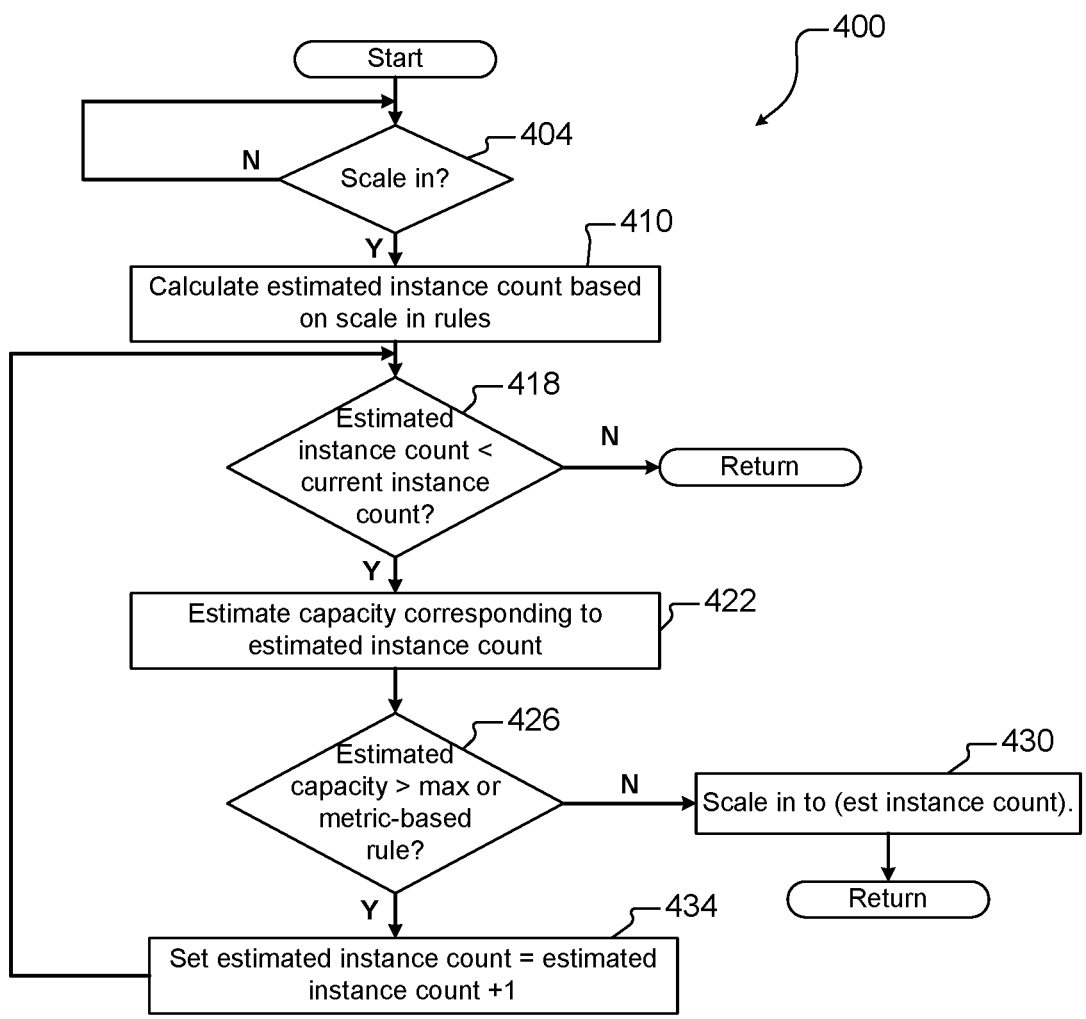
FIGS. 9-10 are flowcharts illustrating examples of methods for preventing flapping during autoscaling in according to the present disclosure.

Referring now to FIG. 9, a method 400 for preventing flapping of resource instances during scale in or scale out steps is shown. As the loading capacity of the cloud resource decreases, the autoscaling component may attempt to scale down to accommodate the decrease in workload. However, there are instances when a decrease in capacity will immediately cause the autoscaling component to attempt to increase capacity. The anti-flapping method described herein reduces toggling between decreasing and increasing capacity. In other examples, the anti-flapping steps are performed when attempting to scale out as well.

At 404, the method determines whether scale in steps need to be performed. When 404 is true, the method calculates an estimated instance count or capacity based on the metric-based rules or other scaling rules at 410. At 418, the method determines whether the estimated instance count is less than the current instance count. If 418 is false, the method returns. If 418 is true, the method estimates the capacity corresponding to the estimated instance count at 422. At 426, the method determines whether the estimated capacity is greater than a corresponding maximum capacity or whether a metric-based or log-based rule is violated by the change. If 426 is false, the method scales into the estimated instance count at 430. If 426 is true, the method sets the estimated instance count equal to the estimated instance count +1 at 434 and the method continues with 418. The process is repeated until either 426 is true or 418 is false.

Figure 10:
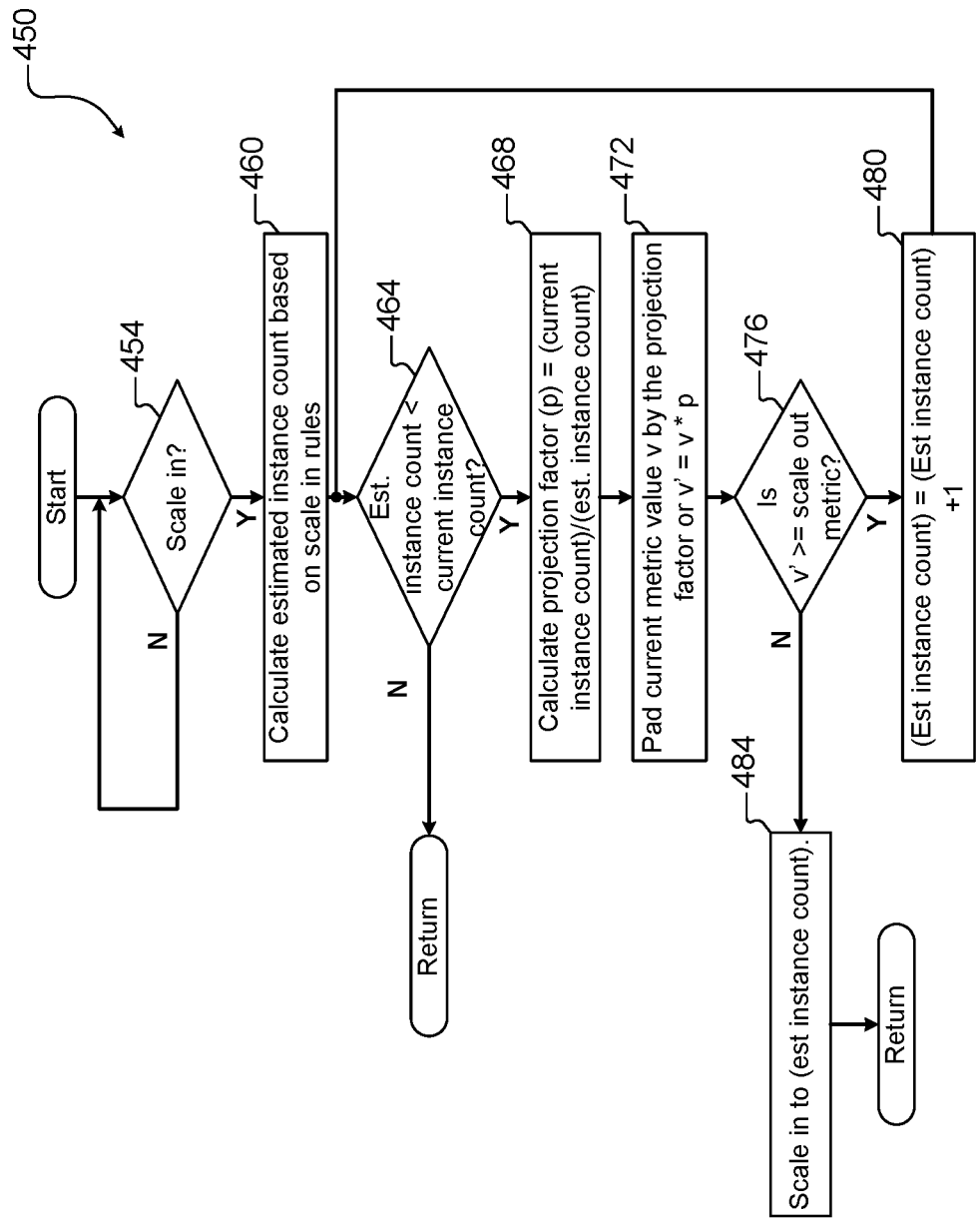

Referring now to FIG. 10, another method 450 is shown. At 454, the method determines whether scale in steps need to be performed. When 454 is true, the method calculates an estimated instance counts based on the metric-based rules or other scaling rules at 460. At 464, the method determines whether the estimated instance count is less than the current instance count. If 464 is false (and the estimated instance count is equal to or greater than the current instance count), the method returns and scaling in is not performed. If 464 is true, the method calculates a projection factor p at 468.

In some examples, the projection factor is based on a current instance count divided by an estimated instance count. In other examples, the projection factor is based on a function of a resource type, a current instance count and an estimated instance count (or p=fx(resource type, current instance count, estimated instance count). In some examples, the function may be a continuous function, a discontinuous function, a step function, a lookup table, a logical function, or combinations thereof. In some examples, the function may be user defined. For example only, the projection factor for one resource type may be calculated as a ratio when the current and estimated instance counts are greater than a predetermined number and a lookup table or step function can be used when the current or estimated instance counts are less than the predetermined number.

At 472, the current metric value v is adjusted by the projection factor or v'=p. At 476, the method compares the adjusted metric value v' to a corresponding scale out metric value to ensure that a scale out condition is not created by the scale in steps being performed.

If 476 is false, the method continues at 484 and scales in to the estimated instance count. If 476 is true, the method adjusts the current estimated instance count by 1 at 480 and the method returns to 464 to recalculate.

In one example, the current VM instance count is equal to 5 and the estimated VM instance count is equal to 2. The VM capacity is currently at 40% and the min/max is equal to 60% and 70%, respectively. When the projection factor is calculated as a ratio of the current instance count and the estimated instance count, the projection factor is equal to 5/2=2.5 and the adjusted metric value v' is equal to 2.5*40%=100%. Since this would immediately cause a scale out operation, the estimated VM instance count is increased to 3. The projection factor is now equal to 5/3=1.6667 and the adjusted metric value v' is equal to 1.667*40%=66.8%, which is within the min/max value. As can be appreciated, there are other ways to calculate the projection factor.

Figure 11:
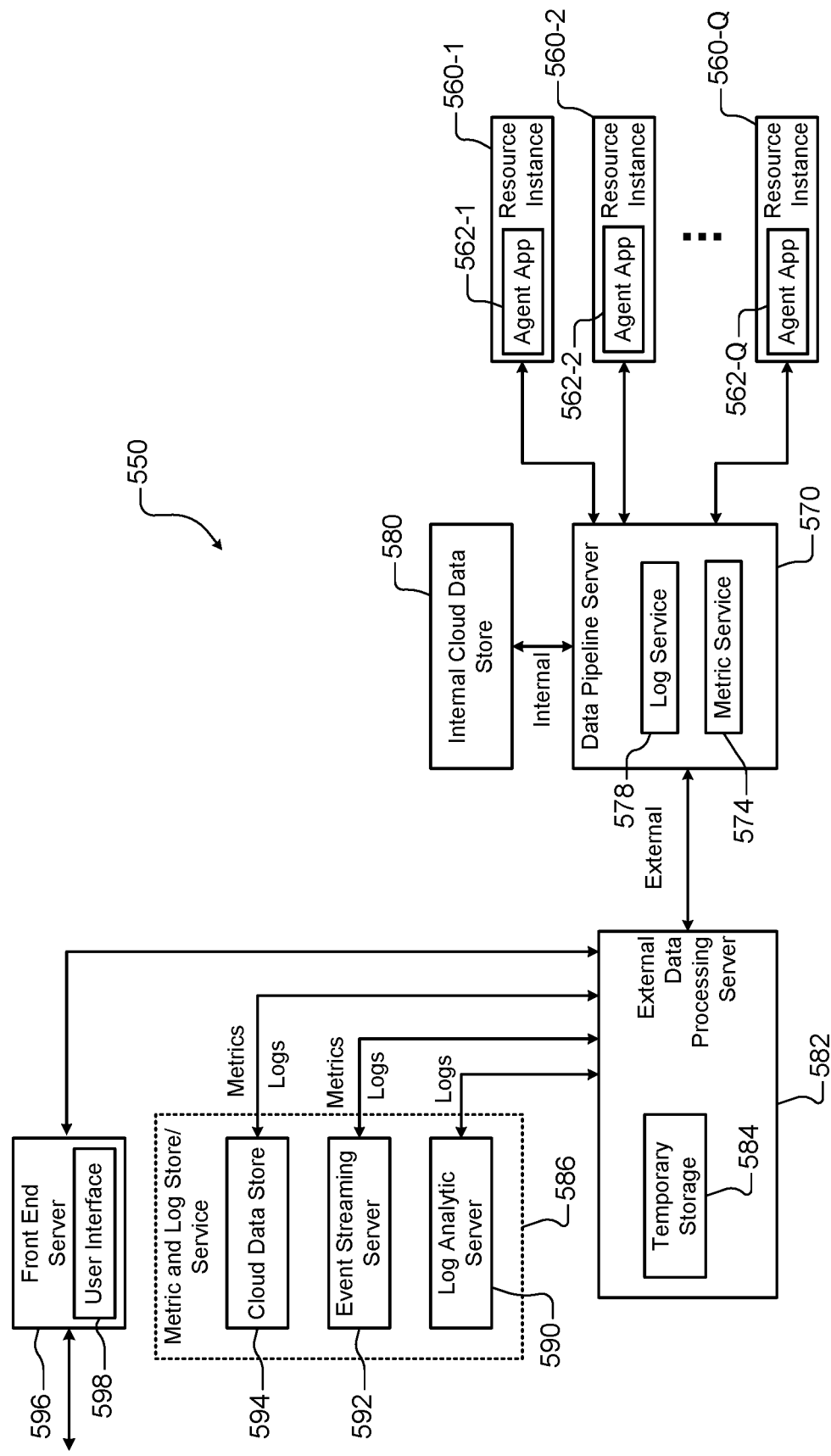
FIG. 11 is a functional block diagram of an example of a metric and log data collection system for multiple different types of resource instances in a cloud network according to the present disclosure.

Referring now to FIG. 11, a metric and log data generating system 550 for multiple different types of resource instances in a cloud network is shown. The metric and log data generating system 550 includes one or more resource instances 560-1, 560-2, . . . , and 560-Q (collectively resource instances 560) each including an agent application 562-1, 562-2, . . . , and 562-Q (collectively agent applications 562). As described above, the resource instances can be resource instances (e.g. with resource instances managed indirectly by the cloud network) or resource instances.

The agent applications 562 monitor predetermined log and metric parameters of the resource instance. The particular log and metric parameters of the resource instances will depend on the type of resource instance that is being monitored. For example, the log data for a virtual machine may include a time when the virtual machine is requested, a time when the virtual machine is deployed and a time when the virtual machine is taken down. For example, the metric data for a virtual machine may include an operating load on the virtual machine (such as an average percentage of the full processor capacity during a predetermined period), a minimum percentage and a maximum percentage. In some examples, the agent applications 562 aggregate the log and/or metric data over one or more predetermined periods. The agent applications 562 send the aggregated log and/or metric data (and/or non-aggregated log and/or metric data) in response to a predetermined recurring period expiring and/or an event occurring to a data pipeline server 570 for further processing.

The data pipeline server 570 may include a metric service 574 and a log service 578 to perform additional aggregation and/or further processing of the metric data and the log data, respectively. The data pipeline server 570 sends log and metric data for internal cloud network usage to an internal cloud data store 580 and sends log and metric data for external cloud network usage to an external data processing server 582. The external data processing server 582 temporarily stores the data in temporary storage 584 and forwards the log and metric data to a metric and log store/service 386. The log data is sent to a log analytic server 590 for further processing. The log data and metric data are sent to an event streaming server 592 for streaming to a location identified by the tenant. The log and metric data are sent to a cloud data store 594 to a storage account associated with the tenant. A front end server 596 provides an application protocol interface (API) including a user interface 598 for configuring log and metric data capture for the resource instances 560.

Figure 12B:
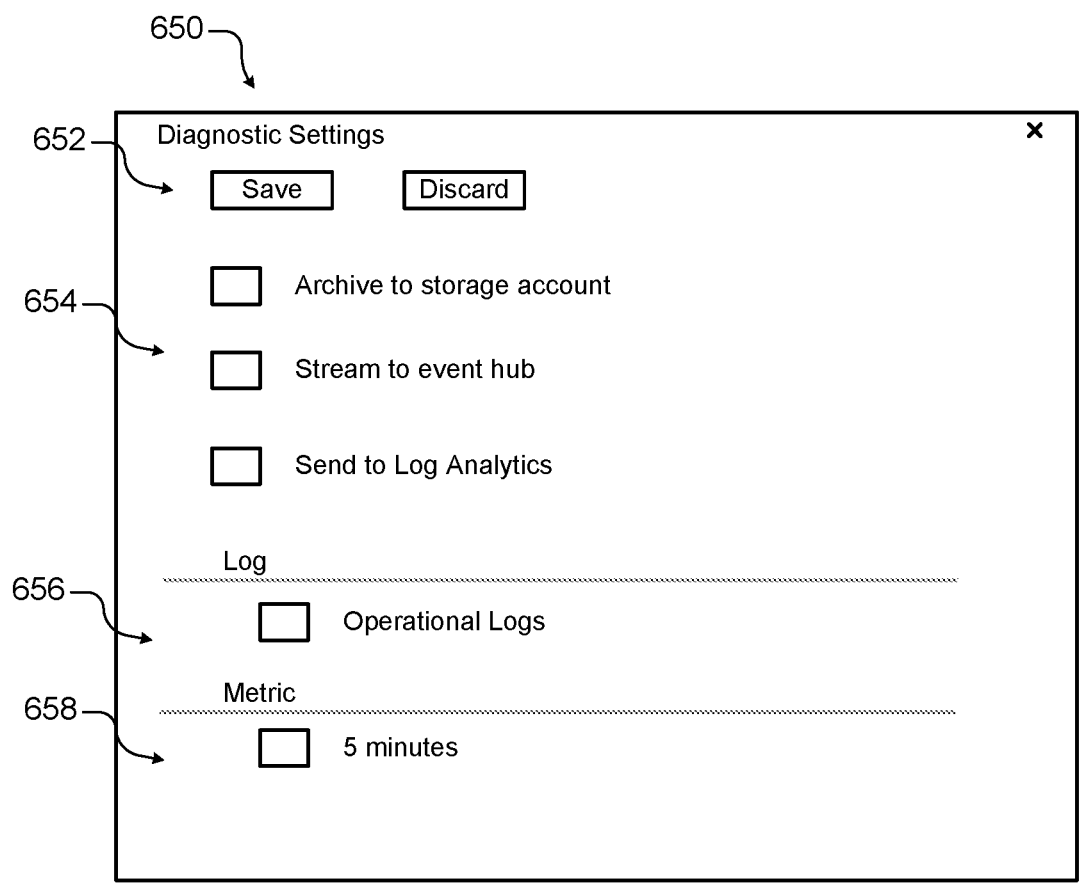

Referring now to FIGS. 12A and 12B, an interface for configuring the capture of log and metric data is shown. In FIG. 12A, an interface 610 allows a tenant to set up various fields including one or more of a name field 620, a resource type 624, a resource group 628, a status 630, a storage account 634 for cloud storage of the log and/or metric data, an event hub namespace 636 and/or log analytics 638. In FIG. 12B, an interface 650 allows diagnostic settings for a log or metric data streams to be selected. Save and/or discard command buttons 652 allow the settings to be saved or discarded. Input selectors 654 allow the tenant to select where the log and metric data are streamed, analyzed and/or stored. Additional inputs 656 and 658 allow access to operational logs and/or sampling of metric data for a predetermined period such as five minutes, although other periods may be used. While specific interfaces are shown, other physical layouts, fields, controls or interfaces may be used.

Figure 13:
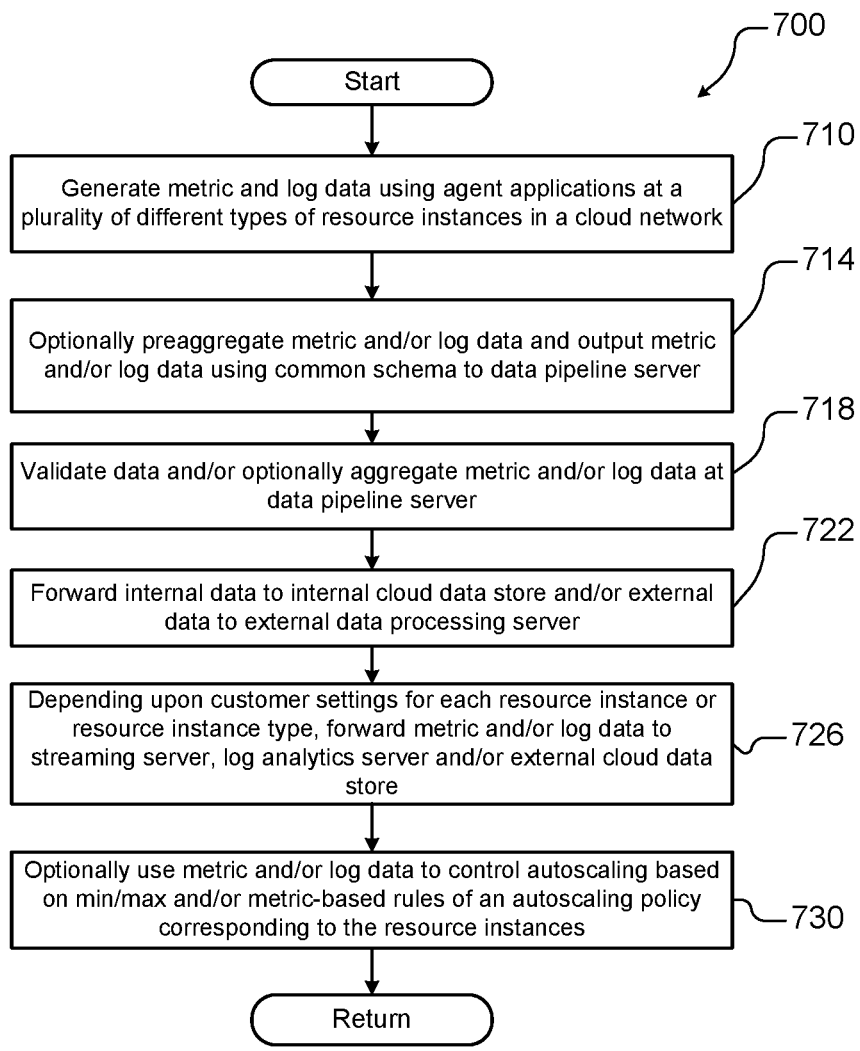
FIG. 13 is a flowchart illustrating a method for collecting metric and log data for multiple different cloud resource types in a cloud network.

Referring now to FIG. 13, a method 700 for generating metric and log data according to the present disclosure is shown. At 710, the metric and log data are generated using agent applications located at a plurality of different types of resource instances in a cloud network. At 714, some of the metric and log data may be pre-aggregated by the agent applications before being sent to the data pipeline server. In some examples, the data is formatted using a common schema. At 718, the data pipeline server validates the data and optionally aggregates metric and/or log data as needed. At 722, internal data is forwarded to an internal cloud data store and external data is forwarded to an external data processing server. At 726, depending upon customer settings for each resource instance and/or each resource instance type, the metric data and/or the log data is forwarded to streaming servers, log analytic servers and/or an external cloud data store. At 730, the metric and/or log data are optionally used to control autoscaling based on minimum and/or maximum values and/or metric-based rules associated with an autoscaling policy corresponding to the particular resource instance or instances.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the FIGs., the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An autoscaling system for scaling resource instances in a cloud network, comprising:
    at least one processor;
    a memory in electronic communication with the at least one processor; and
    instructions stored in the memory being executable by the at least one processor to:
        provide an interface configured to define an autoscale policy including scale in rules and scale out rules for a plurality of different types of resource instances of a tenant;
        receive capacity data corresponding to a first type of resource instance of the plurality of different types of resource instances;
        identify a scaling in action defined by a first rule from the autoscale policy to be performed based on the received capacity data triggering the first rule;
        calculate an estimated instance count for scaling in the first type of resource instance as a result of performing the scaling in action defined by the first rule;
        calculate a projection factor based on the estimated instance count and a current instance count;
        generate adjusted capacity data based on the capacity data and the projection factor;
        determine that the adjusted capacity data triggers a scaling out action defined by a second rule from the autoscale policy;
        calculate an adjusted instance count based on increasing the estimated instance count by an iterative count; and
        selectively scale in the first type of resource instance based on the adjusted instance count.

2. The autoscaling system of claim 1, further comprising instructions being executable by the at least one processor to determine updated capacity data based on the adjusted instance count, wherein selectively scaling in the first type of resource instance is based on determining that the updated capacity data does not trigger the scaling out action defined by the second rule.

3. The autoscaling system of claim 1, further comprising instructions being executable by the at least one processor to:
    calculate a second projection factor based on the adjusted instance count and a current instance count;
    generate second adjusted capacity data based on the adjusted instance count and the second projection factor;
    compare the second adjusted capacity data to the scale out rules; and
    wherein selectively scaling in the first type of resource instance is based on the comparison of the second adjusted capacity data to the scale out rules.

4. The autoscaling system of claim 3, further comprising instructions being executable by the at least one processor to increase the estimated instance count by a plurality of iterative counts until either selectively scaling in the first type of resource instance is performed or the adjusted instance count is equal to the current instance count.

5. The autoscaling system of claim 1, wherein the plurality of different types of the resource instances include a virtual machine type and at least one other type selected from a group consisting of a container type, an event hub type, a telemetry type, an elastic database pool type, a web server type and data storage type.

6. The autoscaling system of claim 1, wherein the iterative count comprises a count of a single resource instance.

7. The autoscaling system of claim 1, wherein calculating the projection factor based on the estimated instance count comprises:
calculating a ratio between the estimated instance count and the current instance count when the current instance count is greater than or equal to a predetermined instance count; or
accessing a lookup table or calculating a step function based on the estimated instance count and the current instance count when the current instance count is less than the predetermined instance count.

8. A method for scaling resource instances in a cloud network, comprising:
defining an autoscale policy including scale in rules and scale out rules for a plurality of different types of resource instances of a tenant;
receiving capacity data corresponding to a first type of resource instance of the plurality of different types of resource instances for the tenant;
identifying a scaling in action defined by a first rule from the autoscale policy to be performed based on the received capacity data triggering the first rule;
calculating an estimated instance count for scaling in the first type of resource instance as a result of performing the scaling in action defined by the first rule;
calculating a projection factor based on the estimated instance count and a current instance count;
generating adjusted capacity data based on the capacity data and the projection factor;
determine that the adjusted capacity data triggers a scaling out action defined by a second rule from the autoscale policy;
calculate an adjusted instance count based on increasing the estimated instance count by an iterative count; and
selectively scaling in the first type of resource instance based on the adjusted instance count.

9. The method of claim 8, further comprising determining updated capacity data based on the adjusted instance count, wherein selectively scaling in the first type of resource instance is based on determining that the updated capacity data does not trigger the scaling out action defined by the second rule.

10. The method of claim 8, further comprising:
calculating a second projection factor based on the adjusted instance count and a current instance count;
generating a second adjusted capacity data based on the adjusted instance count and the second projection factor;
comparing the second adjusted capacity data to the scale out rules; and
wherein selectively scaling in the first type of resource instance is based on the comparison of the second adjusted capacity data to the scale out rule.

11. The method of claim 10, further comprising increasing the estimated instance count by a plurality of iterative counts until either selectively scaling in the first type of resource instance is performed or the adjusted instance count is equal to the current instance count.

12. The method of claim 8, wherein the plurality of different types of the resource instances include a virtual machine type and at least one other type selected from a group consisting of a container type, an event hub type, a telemetry type, an elastic database pool type, a web server type and data storage type.

13. The method of claim 8, wherein the iterative count comprises a count of a single resource instance.

14. The method of claim 8, wherein calculating the projection factor based on the estimated instance count comprises:
calculating a ratio between the estimated instance count and the current instance count when the current instance count is greater than or equal to a predetermined instance count; or
accessing a lookup table or calculating a step function based on the estimated instance count and the current instance count when the current instance count is less than the predetermined instance count.

* * * * *